(12) United States Patent
Zhang et al.

(10) Patent No.: US 9,037,144 B2
(45) Date of Patent: May 19, 2015

(54) METHOD AND BASE STATION, USER EQUIPMENT AND SYSTEM FOR ACTIVATING COEXISTENCE WORK MODE

(71) Applicant: FUJITSU LIMITED, Kawasaki-shi, Kanagawa (JP)

(72) Inventors: Lei Zhang, Beijing (CN); Haibo Xu, Beijing (CN); Hua Zhou, Beijing (CN); Xin Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/845,816

(22) Filed: Mar. 18, 2013

(65) Prior Publication Data

US 2013/0217400 A1 Aug. 22, 2013

Related U.S. Application Data

(63) Continuation of application No. PCT/CN2010/077405, filed on Sep. 28, 2010.

(51) Int. Cl.
*H04W 72/00* (2009.01)
*H04W 72/08* (2009.01)
(Continued)

(52) U.S. Cl.
CPC .......... *H04W 72/082* (2013.01); *H04W 76/026* (2013.01); *H04W 88/10* (2013.01)
USPC ............ 455/450; 370/311; 370/329; 370/336

(58) Field of Classification Search
CPC ............ H04W 16/14; H04W 72/1215; H04W 72/082
USPC ............................ 455/450; 370/311, 329, 336
See application file for complete search history.

(56) References Cited

U.S. PATENT DOCUMENTS 8,085,737 B2 12/2011 Zhu
2006/0211372 A1* 9/2006 Shellhammer et al. ...... 455/41.2
(Continued)

FOREIGN PATENT DOCUMENTS

CN 1358003 7/2002
CN 101479994 7/2009
(Continued)

OTHER PUBLICATIONS

Notice of Reason for Refusal issued for corresponding Japanese Patent Application No. 2013-530516, mailed on Feb. 18, 2014, with an English translation.
(Continued)

*Primary Examiner* — Nathan Taylor
(74) *Attorney, Agent, or Firm* — Myers Wolin, LLC

(57) ABSTRACT

A method for activating coexistence work mode and a base station, user equipment and system using the method. The method for activating coexistence work mode includes: a user equipment in a first communication system transmits an activation mode request, which requests for entering the coexistence work mode, to the base station in the first communication system; in the coexistence work mode, using different transmission resource, the user equipment performs a first communication with the base station and performs a second communication with a device of a second communication system which is different from the first communication system, respectively; the user equipment activates the coexistence work mode based on configuration information of the coexistence work mode, wherein, the configuration information of the coexistence work mode is preset for the user equipment by the base station, and is conserved in the user equipment.

14 Claims, 8 Drawing Sheets

(51) Int. Cl.
*H04W 76/02* (2009.01)
*H04W 88/10* (2009.01)

(56) References Cited

U.S. PATENT DOCUMENTS

| | | | |
|---|---|---|---|
| 2007/0070935 A1 | 3/2007 | Prakash et al. | |
| 2009/0196275 A1* | 8/2009 | Damnjanovic et al. | 370/345 |
| 2009/0219904 A1 | 9/2009 | Khairmode et al. | |
| 2009/0285167 A1* | 11/2009 | Hirsch et al. | 370/329 |
| 2009/0312023 A1* | 12/2009 | Kazmi | 455/436 |
| 2010/0056136 A1 | 3/2010 | Zhu | |
| 2010/0061326 A1* | 3/2010 | Lee et al. | 370/329 |
| 2010/0135256 A1* | 6/2010 | Lee et al. | 370/336 |
| 2011/0243047 A1* | 10/2011 | Dayal et al. | 370/311 |
| 2011/0243094 A1* | 10/2011 | Dayal et al. | 370/331 |
| 2013/0223282 A1* | 8/2013 | Zhang et al. | 370/254 |

FOREIGN PATENT DOCUMENTS

| | | |
|---|---|---|
| EP | 1 207 654 B1 | 1/2008 |
| GB | 2465650 | 6/2010 |
| JP | 2009-060250 A | 3/2009 |
| JP | 2009-200631 A | 9/2009 |
| JP | 2010-514342 A | 4/2010 |
| RU | 2008116625 A | 11/2009 |
| WO | 2009/100150 A1 | 8/2009 |
| WO | 2009/127690 A1 | 10/2009 |
| WO | 2009/137295 A2 | 11/2009 |
| WO | 2010/027208 A2 | 3/2010 |

OTHER PUBLICATIONS

International Search Report issued for corresponding International Patent Application No. PCT/CN2010/077405, mailed Jun. 30, 2011 with English translation.

Office Action issued for corresponding Mexican Patent Application No. MX/a/2013/003632, dated Apr. 29, 2014, with an English translation.

Office Action issued for corresponding Korean Patent Application No. 10-2013-7010529, mailed on May 27, 2014, with an English translation.

First Office Action issued by Rospatent, The federal State Institute for Industrial Property of The Federal Service for Intellectual Property, for corresponding Russian Patent Application 2013113757/07(020355) dated Jul. 15, 2014. English Translation of the Office Action.

Notice of Reason for Refusal issued for corresponding Japanese Patent Application No. 2013-530516, mailed on Nov. 18, 2014, with an English translation.

Decision on Grant issued for corresponding Russian Patent Application No. 2013113757 dated Dec. 16, 2014 with an English translation.

Qualcomm Incorporated, "Problem Scenarios and Proposed Solutions for In-device Coexistence", 3GPP TSG-RAN WG2 Meeting #71, R2-105211, Madrid, Spain, Aug. 23-27, 2010.

First Office Action issued for corresponding Chinese Patent Application No. 201080068971.X dated Jan. 23, 2015 with an English translation.

* cited by examiner

METHOD AND BASE STATION, USER EQUIPMENT AND SYSTEM FOR ACTIVATING COEXISTENCE WORK MODE

CROSS-REFERENCE TO RELATED APPLICATIONS

This application is a continuation of International Patent Application No. PCT/CN2010/077405 filed on Sep. 28, 2010, now pending, the contents of which are herein wholly incorporated by reference.

FIELD OF THE INVENTION

The present invention relates to the field of wireless communications, and in particular to a method for activating a co-existence working mode which allows a user equipment to communicate with apparatuses of two or more communication systems at the same time by using different transmission resources, and to a base station, a user equipment and a communication system using the method.

BACKGROUND OF THE INVENTION

With the rapid advancements in wireless communication systems, user equipment (a.k.a. terminal equipment) such as the mobile phone is playing a bigger role in people's life. In addition to its communication functions, other functions of the user equipment, e.g., accessing a WLAN (Wireless Local Area Network) by the user equipment, have been increasingly explored. Moreover, to facilitate the user equipment to implement communication links and data interchange with other apparatuses, IR (infrared), Bluetooth and USE interfaces are becoming part of a standard configuration of the user equipment. Especially, Bluetooth headphones are increasingly widely used. WLAN systems, Bluetooth systems, and the like all work at the ISM (Industrial, Scientific and Medical) bands. For example, as one of the commonly used ISM bands in the word, the band 2400 MHz-2483.5 MHz is also one of the most commonly used ISM bands.

When a user equipment communicates with another apparatus at a frequency band that is close to, or a multiple of, the frequency band at which the user equipment communicates with its corresponding base station, these two types of communication may interfere with each other. For example, a wireless communication system Long-Term Evolution (LTE) system is one of the systems beyond 3G (IMT-2000). An LTE system may work at many frequency bands according to the LTE series specification. Of these frequency bands used by LTE, some are adjacent to the ISM bands, e.g., band 40 for LTE TDD (Time Division Duplex) system deployments: 2300MHz-2400MHz; band 7 for LTE FDD (Frequency Division Duplex) system deployments: 2500MHz-2570MHz (uplink), 2620MHz-2670MHz (downlink). Of these frequency bands used by LTE, some are a multiple of the frequency bands used by the GPS (Global Positioning System) system, e.g., band 13 for LTE FDD system deployments: 777MHz-787MHz (uplink), 746MHz-756MHz (downlink); and band 14 for LTE FDD system deployments: 788MHz-798MHz (uplink), 758MHz-768MHz (downlink). When an LTE user equipment works at one of the aforementioned frequency bands, if a WLAN system or a Bluetooth system on the user equipment is activated, then the LTE system and the ISM system (the WLAN system, the Bluetooth system, or the like) working at adjacent frequency bands in the user equipment may interfere with each other due to adjacent-band leakage, which may even result in a communication failure when the bit error rate is high. If a GPS system on the user equipment is started up at the same time, the GPS system may fail to function due to harmonic interferences from the LTE system.

A conventional method to solve the above problem is to employ a higher-performance transmission filter in the transmitting terminal on the user equipment for the communication with the base station, e.g., an LTE system, and/or in the transmitting terminal on the user equipment for the communication with another apparatus, e.g., an ISM system, to reduce adjacent-band leakage and/or harmonic interferences to the greatest extent possible. A disadvantage of this method is that it significantly increases the cost of the user equipment.

SUMMARY OF THE INVENTION

Some embodiments of the present disclosure provide a method for setting up a co-existence working mode, by which a co-existence working mode which allows two or more communication systems to coexist in the same user equipment (i.e., the user equipment to communicate with apparatuses of two or more communication systems at the same time by using different transmission resources) can be set up rapidly. Moreover, some embodiments of the present disclosure provide a base station, a user equipment and a communication system using the method.

According to an aspect of the present disclosure, it is provided a method for activating a co-existence working mode, including: transmitting, by a user equipment of a first communication system to a base station in the first communication system, an activation request for requesting to enter a co-existence working mode in which the user equipment performs a first communication with the base station and performs a second communication with an apparatus of a second communication system, which is different from the first communication system, by using different transmission resources; and activating, by the user equipment, the co-existence working mode according to configuration information of the co-existence working mode, wherein the configuration information of the co-existence working mode is pre-configured for the user equipment by the base station and is stored in the user equipment.

According to another aspect of the present disclosure, it is provided a user equipment. The user equipment is configured in a first communication system and has a co-existence working mode in which the user equipment performs a first communication with a base station in the first communication system and performs a second communication with an apparatus of a second communication system, which is different from the first communication system, by using different transmission resources. The user equipment includes: a storage device, configured to store configuration information of the co-existence working mode pre-configured for the user equipment by the base station; a transmitting device, configured to transmit to the base station in the first communication system an activation request for requesting to enter the co-existence working mode; and a co-existence mode activating device, configured to activate the co-existence working mode according to the configuration information of the co-existence working mode.

According to another aspect of the present disclosure, it is provided a method for activating a co-existence working mode, including: receiving, by a base station in a first communication system from a user equipment, an activation request for requesting to allow the user equipment to enter a co-existence working mode in which the user equipment performs a first communication with the base station and performs a second communication with an apparatus of a second communication system, which is different from the first communication system, by using different transmission resources; and the base station performs communication with the user equipment by using a transmission resource different from that used in the second communication, wherein the base station pre-configures configuration information of the co-existence working mode for the user equipment in advance.

According to another aspect of the present disclosure, it is provided a base station. The base station is configured in a first communication system, and may include: a receiving device, configured to receive from a user equipment an activation request for requesting to allow the user equipment to enter a co-existence working mode in which the user equipment performs a first communication with the base station and performs a second communication with an apparatus of a second communication system, which is different from the first communication system, and the base station performs communication with the user equipment by using a transmission resource different from that used in the second communication; and a pre-configuring device, configured to pre-configure configuration information of the co-existence working mode for the user equipment in advance.

According to another aspect of the present disclosure, it is provided a communication system including the base station and the user equipment.

Moreover, an embodiment of the present disclosure provides a computer program for implementing the above method.

Furthermore, an embodiment of the present disclosure provides a computer program product in at least the form of a computer readable medium, on which computer program code for implementing the above method is stored.

BRIEF DESCRIPTION OF THE DRAWINGS

The above and other objects, characteristics and advantages of the present disclosure will become apparent with the description below of the embodiments of the present disclosure in combination with the accompanying drawings. The components in the figures are not drawn to scale, but are used to illustrate the principle of the present disclosure. In the figures, the same or like technical features and components are denoted with the same or like reference numerals.

DETAILED DESCRIPTION OF THE EMBODIMENTS

The embodiments of the present disclosure will be hereinafter described with reference to the accompanying drawings. An element or feature described in one of the figures or embodiments can be combined with an element or feature shown in one or more of the other figures or embodiments. It should be noted that, in the interest of clarity, those components and processes unrelated to the present disclosure, and known to a skilled person, are omitted from the figures and the description.

Two types of communication may take place at the same time in a user equipment of a wireless communication system. One is the communication between the user equipment and a base station (for the convenience of description, this type of communication will be hereinafter referred to as a "first communication", and the communication system will be hereinafter referred to as a "main communication system" or "first communication system"), and the other is the communication between the user equipment and apparatuses in one or more other communication systems, e.g., an access point (AP) in a WLAN system, an apparatus in a Bluetooth or GPS system (for the convenience of description, this type of communication will be hereinafter referred to as a "second communication", and the concerned communication system will be hereinafter referred to as a "interfering system" or "second communication system"). The frequency bands at which the first and second communication systems work may be adjacent or close to each other; or, one of the frequency bands is a multiple of the other. For example, the first communication system and the second communication system may be an LTE system and an ISM system, or an LTE system and a GPS system. In such cases, there is a situation where the two communication systems may interfere with each other due to adjacent-channel leakage and/or harmonic interferences.

Figure 1A:
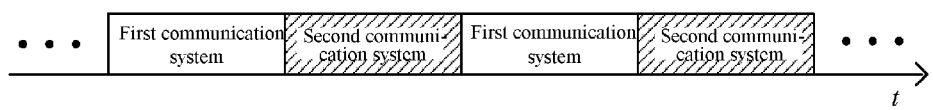
FIG. 1A is a schematic diagram illustrating a scenario where a first communication between the user equipment and the base station and a second communication between the user equipment and another apparatus are performed in a time-division multiplexing manner.
Figure 1B:
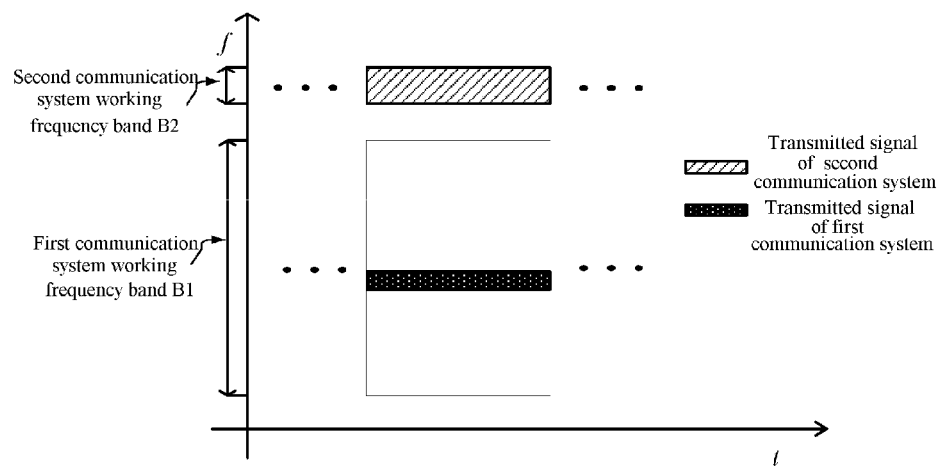
FIG. 1B is a schematic diagram illustrating a scenario where a first communication between the user equipment and the base station and a second communication between the user equipment and another apparatus are performed in a frequency-division multiplexing manner.

The inventors of the present disclosure found that the first communication and the second communication can be performed in a time-division multiplexing (TDM) manner or frequency-division multiplexing (FDM) manner, thereby avoiding such interference. FIG. 1A is a schematic diagram illustrating a scenario where a first communication and a second communication are performed in a TDM manner. As shown in FIG. 1A, in the time domain, a first communication system and a second communication system work at different time slots. That is, in a TDM manner, during a period of time when the user equipment performs a first communication with an apparatus of the first communication system, it is not allowed to perform a second communication with an apparatus of the second communication system; and vice versa. FIG. 1B is a schematic diagram illustrating a scenario where a first communication and a second communication are performed in a FDM manner. As shown in FIG. 1B, the working frequency bands of the first and second communications can be made so that they are as far way from each other as possible, and/or no one is a multiple of the other, in order to reduce mutual interference. Similarly, more than two communication systems can coexist in the same user equipment in these manners. In this disclosure, the working mode which allows two or more communication systems coexist in the same user equipment, that is, the working mode in which the user equipment performs a first communication with the base station and performs a second communication with an apparatus in an interfering system by using different time or frequency resources, is referred to as a co-existence working mode. According to different types of main communication systems and interfering systems, various co-existence working modes may be provided to suit these different types. For example, one or more TDM-based co-existence working modes may be provided, and they can have different time resource allocation schemes. For example, one or more FDM-based co-existence working modes may be further provided, and they can have different frequency resource allocation schemes.

An embodiment of the present disclosure provides a method for rapidly setting up (activating) a co-existence working mode as discussed above, and a user equipment, a base station, and a system using the method.

Figure 2A:
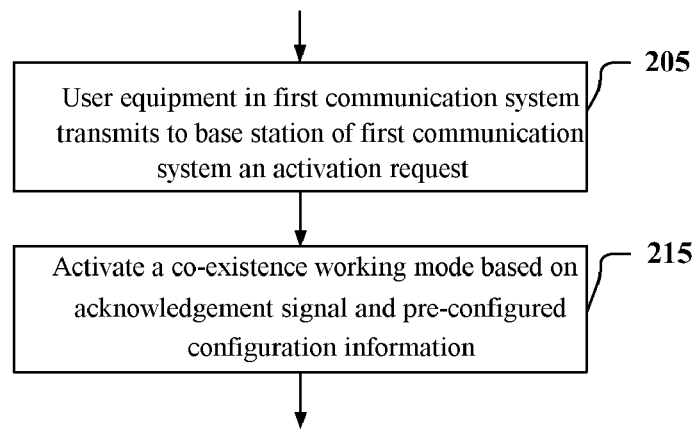
FIG. 2A is a schematic flowchart of a method according to an embodiment of the present disclosure in which the user equipment activates a co-existence working mode.

FIG. 2A illustrates a schematic flow of a method according to an embodiment of the present disclosure in which a user equipment of a first communication system sets up (activates) a co-existence working mode.

In the method as shown in FIG. 2A, the user equipment stores configuration information of the co-existence working mode pre-configured for the user equipment by a base station, and requests to activate the co-existence working mode when it is needed to enter the co-existence working mode (e.g., upon detecting an interfering system).

As shown in FIG. 2A, the method may include step 205 and step 215.

Specifically, in step 205, when it is needed to enter a co-existence working mode (e.g., after detecting a second communication system working at a frequency band adjacent to the frequency band at which the first communication system works), the user equipment transmits to a base station of the first communication system an activation request, for requesting to enter a co-existence working mode.

As an example, the base station may pre-configure for the user equipment one co-existence working mode and the configuration information of the co-existence working mode; and in this case, the co-existence working mode is a default co-existence working mode. As another example, the base station may pre-configure for the user equipment two or more co-existence working modes and the configuration information of each of the co-existence working modes; and in this case, one of the co-existence working modes may be set as a default co-existence working mode.

As an example, the user equipment may select one from a plurality of co-existence working modes pre-configured for the user equipment by the base station. The user equipment may encapsulate information indicating the selected mode (for example, the plurality of pre-configured working modes can be numbered, and thus the information may include a serial number of the selected mode) in the activation request to transmit it to the base station. As another example, the activation request may not include such information; and in this case, the co-existence working mode that the user equipment requests to enter is by default the pre-configured default co-existence working mode.

In step 215, the user equipment activates a co-existence working mode according to the stored configuration information pre-configured for the user equipment by the base station. The co-existence working mode to be activated may be a default co-existence working mode, or a co-existence working mode selected by the user equipment (of which the base station has been notified via the activation request). As an example, the user equipment may determine whether the base station has successfully received the activation request according to information returned from the base station side. For example, if it is determined that the base station has successfully received the activation request, e.g., upon receipt of an acknowledgement signal (i.e., an ACK signal) returned from the base station side that signifies that the base station has successfully received the activation request, step 215 is performed. If a NACK signal returned from the base station side is received, it indicates failure of transmitting the activation request. In the case where the maximum retransmission count is not reached, the user equipment can retransmit the activation request.

Figure 3A:
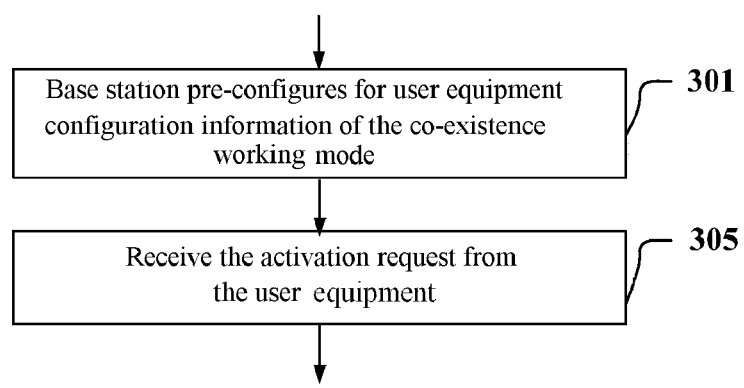
FIG. 3A is a schematic flowchart of a method corresponding to the method of FIG. 2A in which the base station activates a co-existence working mode.

FIG. 3A illustrates a schematic flowchart of a method corresponding to the method shown in FIG. 2A in which the base station sets up a co-existence working mode.

As shown in FIG. 3, the method may include step 305 and step 301.

Figure 4:
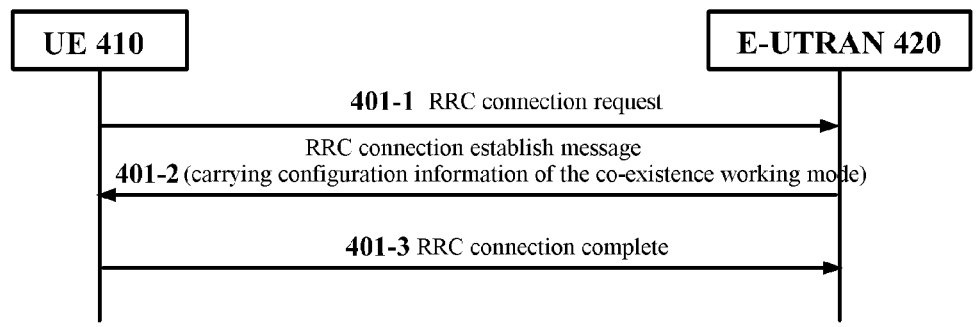
FIG. 4 is a schematic diagram illustrating an example of a method in which the base station pre-configures for the user equipment configuration information of a co-existence working mode.
Figure 5:
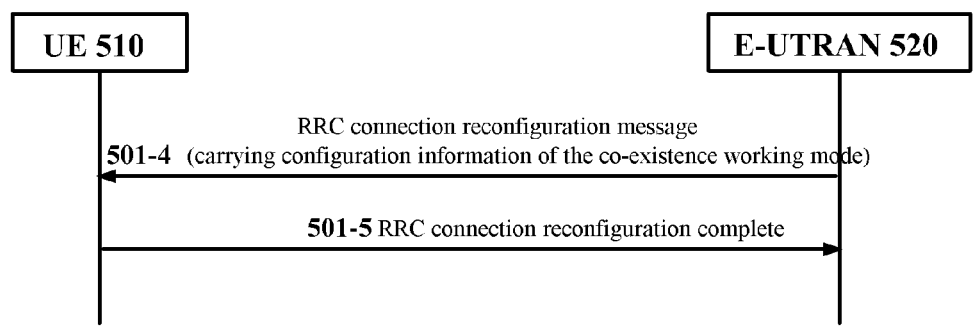
FIG. 5 is a schematic diagram illustrating another example of a method in which the base station pre-configures for the user equipment configuration information of a co-existence working mode.

Step 301 is a step wherein the base station pre-configures for the user equipment a co-existence working mode and the configuration information. As an example, this step may take place during the establishment of the RRC (Radio Resource Control) connection between the base station and the user equipment. As another example, this step may take place during the reconfiguration of the RRC connection between the base station and the user equipment. FIG. 4 and FIG. 5 each illustrate one of the examples.

As shown in FIG. 4, when a user equipment (UE) 410 enters an RRC_Connected state from an RRC_idle state, it transmits an RRC connection request to a base station (E_UTRAN) 420 (as shown in step 401-1). The base station encapsulates the configuration information of a co-existence working mode in an RRC connection establish message and transmits the message to the user equipment (step 401-2). The user equipment returns an RRC connection complete message to the base station (step 401-3), confirming receipt of the configuration information.

As shown in FIG. 5, when a user equipment 510 is in an RRC_Connected state, if a base station 520 detects activation of a network at an interfering frequency band (e.g., ISM), and thus judges that the user equipment may need a co-existence working mode, then the base station 520 encapsulates the configuration information of a co-existence working mode in an RRC connection reconfiguration message, and transmits the message to the user equipment (step 501-4). The user equipment may return an RRC connection reconfiguration complete message to the base station (step 501-5), confirming receipt of the configuration information.

It shall be understood that the above methods for pre-configuration of a co-existence working mode are only exemplary but not exhaustive; and information related to a co-existence working mode can be pre-configured at any other suitable timing and using any other suitable method. Detailed description is therefore omitted here.

Step 305 corresponds to step 205 described with respect to FIG. 2A. In step 305, the base station receives the activation request from the user equipment. After receiving the activation request, the base station learns that the user equipment is about to activate a co-existence working mode, so that the base station can perform corresponding configurations on those resources needed in the communication with the user equipment.

As described above, the activation request may include information indicating a co-existence working mode selected by the user equipment. In this case, the base station learns that the user equipment is about to activate the selected co-existence working mode, and may perform corresponding configuration according to stored configuration information. The activation request may not include such information; and in this case, the base station may determine that the user equipment is about to activate a pre-configured default co-existence working mode.

As an example, after the base station successfully receives the activation request, an acknowledgement signal may be returned from the base station side to the user equipment for indicating whether the activation request is correctly received, e.g., an ACK signal if the activation request is correctly received, and a NACK signal otherwise.

Figure 2B:
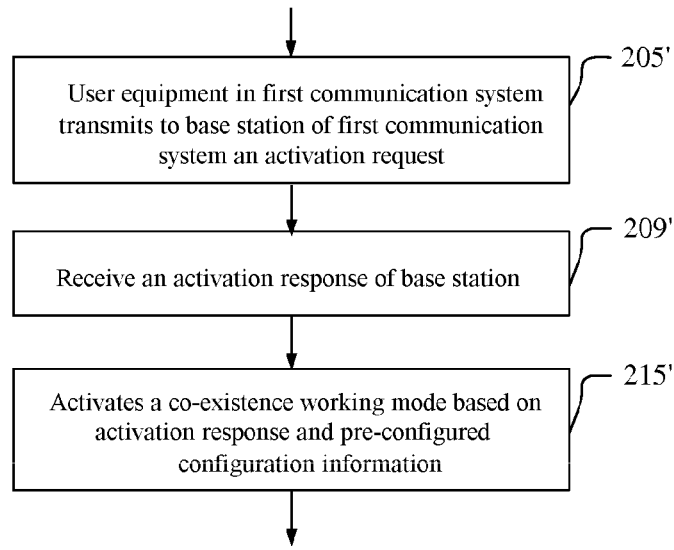
FIG. 2B is a schematic flowchart of a method according to another embodiment of the present disclosure in which the user equipment activates a co-existence working mode.

FIG. 2B illustrates a schematic flowchart of a method according to another embodiment of the present disclosure in which the user equipment sets up (activates) a co-existence working mode.

In the method as shown in FIG. 2B, after transmitting the activation request to the base station, the user equipment needs to await a response signal (a.k.a. activation response) returned by the base station to the activation request, and activates a co-existence working mode according to the activation response.

As shown in FIG. 2B, the method may include step 205', 209' and 215'.

Step 205' is similar to step 205: when it is needed to enter a co-existence working mode (e.g., after detecting a second communication system working at a frequency band adjacent to the frequency band at which the first communication system works), the user equipment transmits to a base station of the first communication system an activation request, for requesting to enter a co-existence working mode. Similarly to the above embodiment, the activation request may include information indicating a co-existence working mode selected by the user equipment; or may not include such information.

In step 209', the user equipment receives an activation response from the base station. In step 215', the user equipment activates a co-existence working mode according to the stored configuration information pre-configured for the user equipment by the base station. As an example, the co-existence working mode to be activated may be a default co-existence working mode. As another example, the co-existence working mode to be activated may be a co-existence working mode selected by the user equipment (of which the base station has been notified via the activation request). As an example, the activation response may include information indicating whether the base station allows the user equipment to enter the co-existence working mode. In this case, the user equipment may judge whether it is allowed to activate the co-existence working mode according to the activation response, and if so, the process of step 215' is performed; otherwise, the co-existence working mode is not activated. As another example, the activation response may include information indicating a co-existence working mode appointed for the user equipment by the base station. In this case, the user equipment activates, in step 215', the co-existence working mode appointed by the base station according to corresponding stored configuration information.

Figure 3B:
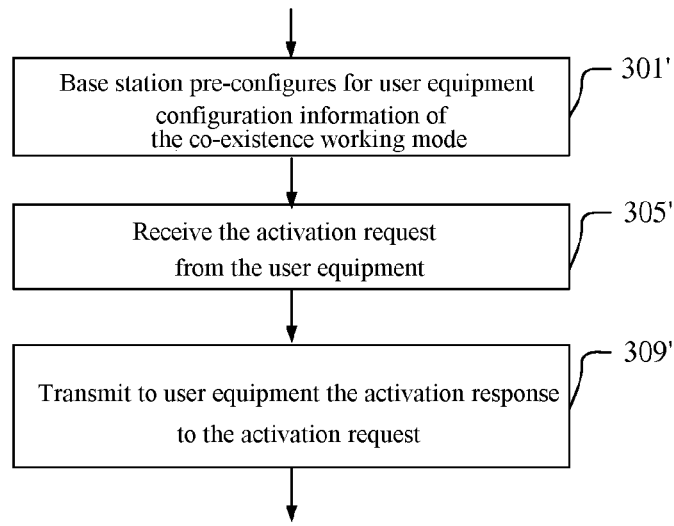
FIG. 3B is a schematic flowchart of a method corresponding to the method of FIG. 2B in which the base station activates a co-existence working mode.

FIG. 3B illustrates a schematic flowchart of a method corresponding to the method shown in FIG. 2B in which the base station sets up a co-existence working mode.

As shown in FIG. 3, the method may include step 305', 309' and 301'.

Step 301' is a step wherein the base station pre-configures for the user equipment a co-existence working mode and the configuration information of the co-existence working mode, which is similar to step 301. Detailed description is therefore omitted here.

Step 305' and step 309' correspond to step 205' and step 209' described with respect to FIG. 2B, respectively. In step 305', the base station receives an activation request from the user equipment. As described above, the activation request may include information indicating a co-existence working mode selected by the user equipment; or may not include such information. In step 309', the base station returns to the user equipment an activation response.

As an example, after receiving the activation request, the base station may judge whether to allow the user equipment to enter the co-existence working mode according to system operational status (status of the current cell (e.g., status of current resource usage) and status of the user equipment (e.g., current service on the user equipment)), and if so, the base station encapsulates information indicating whether the user equipment is allowed to enter the co-existence working mode in the activation response. As another example, the base station may appoint a co-existence working mode for the user equipment, and transmit information indicating the co-existence working mode appointed for the user equipment to the user equipment (e.g., by encapsulating it in the activation response).

In the above method, the configuration information of a co-existence working mode is pre-configured in a user equipment. Therefore, when the user equipment needs to enter the co-existence working mode, it no longer needs to configure the co-existence working mode, which can significantly reduce the time required for activating the co-existence working mode, and allow the user equipment to rapidly enter the co-existence working mode, thereby improving user experience.

Figure 6:
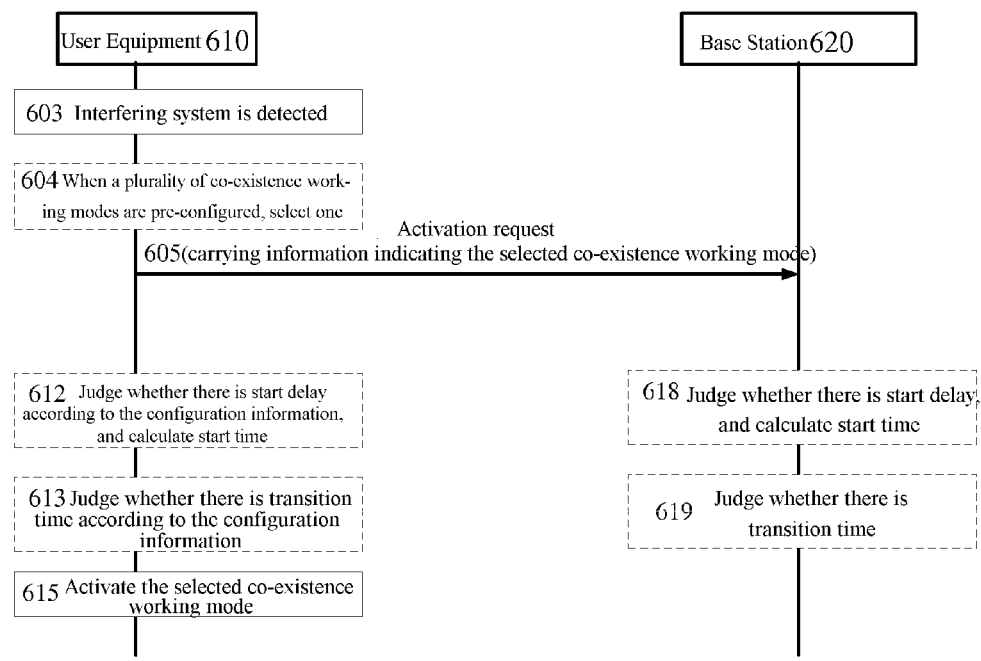
FIG. 6 is a schematic diagram illustrating a method for setting up a co-existence working mode according to an embodiment of the present disclosure.

FIG. 6 illustrates a specific example of a user equipment 610 and a base station 620 setting up a co-existence working mode.

As shown in FIG. 6, upon detecting an interfering system (step 603), the user equipment may transmits an activation request to the base station (step 605). After the base station 620 correctly receives the activation request, an ACK signal is returned from the base station side to the user equipment 610. Optionally, when the configuration information pre-configured for the user equipment by the base station involves two or more co-existence working modes, the user equipment may, before transmitting the activation request, select one from these co-existence working modes (step 604). The user equipment may also encapsulate information indicating the selected mode (e.g., a serial number of the mode) in the activation request. Using this method, when a plurality of co-existence working modes are configured, the user equipment can select a co-existence working mode that suits the interfering system according to information such as type of the interfering system, improving communication under the co-existence working mode. As another specific example, the activation request may not include information of the co-existence mode selected by the user equipment 610.

After receiving the ACK signal, the user equipment 610 may directly enter a default co-existence working mode, or a co-existence working mode selected in step 604. If a NACK signal is received, it can be judged that the transmission of the activation request fails. If the maximum retransmission count is not reached, the user equipment 610 retransmits the activation request.

In the above example, the base station only needs to return a single acknowledgement signal after receiving the activation request, and the user equipment directly activates the co-existence working mode after receiving the ACK signal from the base station. This method significantly reduces interactions between the base station and the user equipment, and thus can further decrease the time required for setting up a co-existence working mode.

The activation request may include at least one bit. As an example, the activation request may include only one bit, wherein "1" or "0" assigned to the bit can signify that the user equipment requests to enter a co-existence mode. The bit may be encoded or modulated, and thus converted into multi-bit information or a complex symbol. As a specific example, the activation request can be transmitted by the user equipment 610 via the physical layer. For example, when the first communication system is an LTE system, a new PUCCH (Physical Uplink Control Channel) format based on the LTE standard may be used to transmit the activation request, which may be named "PUCCH Format 3". For example, the first communication system may pre-allocate a region (PUCCH region) for PUCCH Format 3. After detecting an interfering system (i.e., when it is needed to enter a co-existence working mode), the user equipment 610 may, regardless of what information the firstly occurring PUCCH allocated to the user equipment 610 is supposed to carry, use the PUCCH to transmit the activation request instead of said information (e.g., the activation request includes one bit).

As another specific example, the activation request may be transmitted by the user equipment 610 via the MAC (media access control) layer. For example, when the first communication system is an LTE system, a new MAC control element may be defined based on the LTE standard: CoEX MAC CE. As a specific example, a new LCID value may be defined for CoEX MAC CE, for example, the LCID value can be "01011". When the user equipment 610 needs to transmit an activation request, the following MAC sub-header can be included in a MAC PDU (packet data unit):

| R | R | C | LCID 01011 | where
R: a reserved bit, which may be set to be '0';
E: an extension field, which is an identifier indicating whether other fields exist in the MAC header. E being set to be "1" indicates that at least one other R/R/E/LCID field exits. E being set to be "0" indicates that there is a MAC SDU (service data unit), a MAC control element, or padding starts at the next byte.
LCID=01011 indicates that the corresponding MAC control element (MAC CE) is a CoEX MAC CE.

The length of the CoEX MAC CE corresponding to the MAC sub-header shown above is 0 in bytes.

Upon receipt of a MAC sub-header with LCID=01011, the base station learns that the user equipment is requesting to activate a co-existence working mode.

Compared with the method that activates a co-existence working mode using RRC layer signaling, using MAC layer signaling can activates a co-existence working mode faster. Moreover, since MAC layer signaling is also provided with a corresponding HARQ (Hybrid Automatic Retransmission Request) process, the reliability of the activation signaling of the co-existence mode can be highly ensured.

As an example, the configuration information of each co-existence working mode pre-configured for the user equipment 610 by the base station 620 may include information indicating a start delay of the co-existence working mode. In this case, the user equipment 610 may determine a start time of the co-existence working mode according to the time when the ACK signal is received and the start delay (step 612). The base station 620 may determine the time when the user equipment starts the co-existence working mode according to the time when the ACK signal is transmitted and the start delay (step 618). The user equipment and the base station can accurately determine the time to enter the co-existence working mode with the start delay being set. The start delay is set to be included in the pre-configured configuration information so that information interactions during the establishment of the co-existence working mode can be reduced, thus further speeding up the establishment of the co-existence working mode.

As an example, the configuration information of the co-existence working mode pre-configured for the user equipment 610 by the base station 620 may further include information indicating a transition time of each co-existence mode. The transition time of a co-existence working mode refers to a period of time for which a previous working mode is kept after the co-existence working mode is activated or terminated. For example, in the case where the co-existence working mode is a TDM-based mode, before entering the co-existence working mode, some data transmitted in a normal working mode (the working mode in which the user equipment communicates with only the base station) might still have HARQ information interacting, or might still need to be retransmitted. Therefore, a transition time set before practicing the co-existence working mode may be desirable, allowing the transmission of said data to be completed in the normal working mode. Likewise, after the user equipment receives an instruction transmitted by the base station to terminate a co-existence working mode, some data transmitted in the co-existence working mode might still have HARQ information interacting, or might still need to be retransmitted. And a transition time set before restoring the normal working mode may be also desirable, allowing the transmission of said data to be completed in the co-existence working mode. Therefore, a suitable transition time may be set for each co-existence working mode. As a specific example, the configuration information of a co-existence working mode pre-configured for the user equipment 610 by the base station 620 may include information indicating whether to use a transition time, the length of the transition time, and the like. In this case, the user equipment 610 may judge, according to the configuration information, whether to use the transition time after activating the co-existence working mode (step 613). The base station 620 may also judge according to the configuration information whether to use the transition time after the user equipment activates the co-existence working mode (step 619). Optionally, the user equipment may also judge, according to configuration information of a co-existence working mode, whether to use a transition time before terminating the co-existence working mode. It shall be understood that the length of a transition time may be defined according to the actual application scenario, and is not limited here. By setting a transition time for each co-existence working mode, reliable transmission of data and signaling during the transition between working modes can be ensured, thus making sure a smooth transition between the working modes. By including the information of a transition time of each co-existence working mode in the pre-configured configuration information, information interactions during the activation of the co-existence working mode can be reduced, thus further speeding up the activation of the co-existence working mode.

Figure 7:
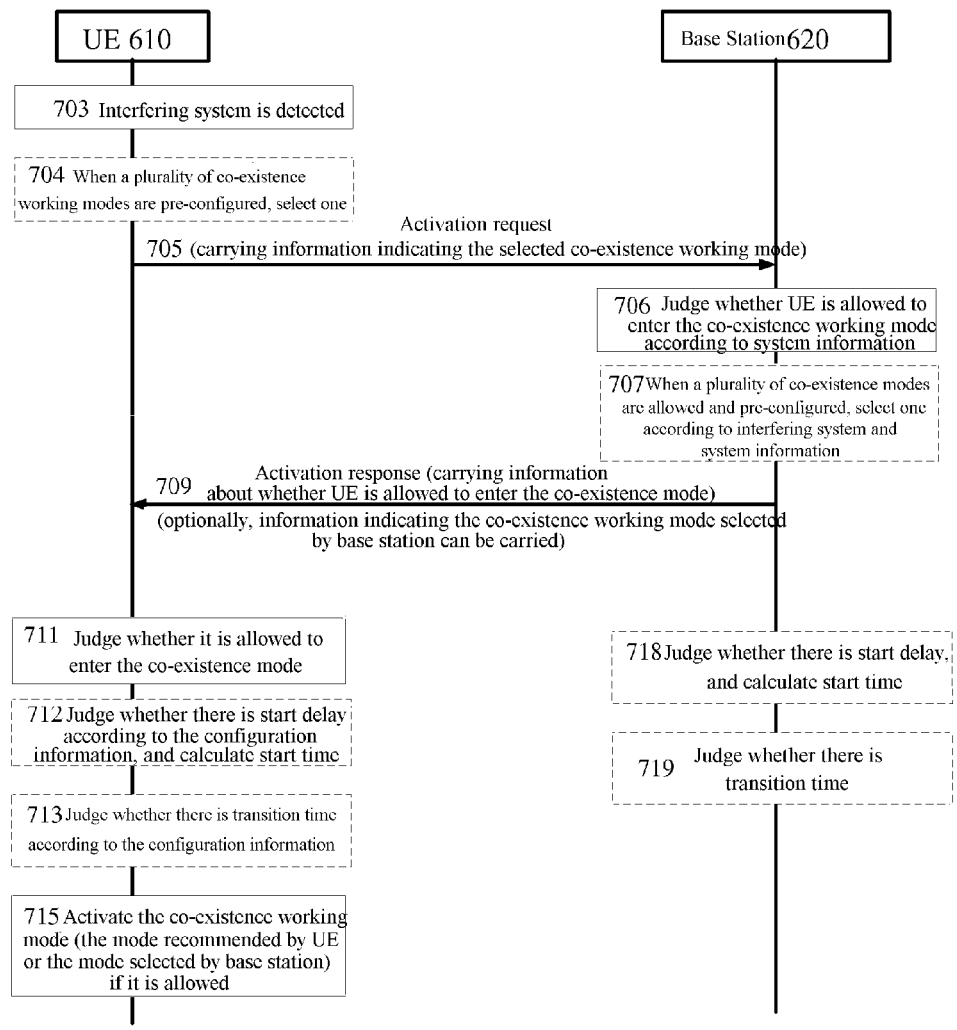
FIG. 7 is a schematic diagram illustrating a method for setting up a co-existence working mode according to another embodiment of the present disclosure.

FIG. 7 illustrates another specific example of a user equipment 610 and a base station 620 setting up a co-existence working mode.

As shown in FIG. 7, upon detecting an interfering system (step 703), the user equipment 610 may transmits an activation request to the base station 620 (step 605). Similarly to the example as shown in FIG. 6, when the configuration information pre-configured for the user equipment by the base station involves two or more co-existence working modes, the user equipment 610 may, before transmitting the activation request, select one from these co-existence working modes (step 704). The user equipment may encapsulate information indicating the selected mode in the activation request. As another example, the activation request may not include information of the co-existence mode selected by the user equipment 710.

After receiving the activation request, the base station 620 judges whether to allow the user equipment 610 to enter the co-existence working mode according to system information (step 706), and returns an activation response signal (step 709). The activation response signal includes information indicating whether the user equipment 610 is allowed to enter the co-existence working mode. As an example, the base station 620 may choose to use a default co-existence working mode, or a co-existence working mode selected by the user equipment. As another example, the base station 620 may reselect a co-existence working mode for the user equipment from the pre-configured co-existence working modes according to system information, and notifies the user equipment 610 of said co-existence working mode via the activation response.

After the user equipment 610 successfully receives the activation response, an acknowledgement signal (e.g., ACK signal), with which the user indicates the user equipment has successfully received the activation response, is returned from the user equipment side to the base station.

Then, the user equipment 610 judges whether it is allowed to enter the co-existence working mode according to the activation response (step 711), and if so, the step of activating the co-existence working mode (shown as step 715) can be performed; otherwise, the requesting of activation ends.

In the example shown in FIG. 7, after receiving the activation request, the base station 620 judges whether to allow the user equipment 610 to enter the co-existence working mode according to the current cell status (e.g., current status of resource usage) and user equipment status (e.g., current service on the user equipment). The user equipment 610 may judge whether it is allowed to enter the co-existence working mode according to the activation response. In the method shown in FIG. 7, the base station may judge whether to operate and enter the co-existence working mode according to actual system operational status. As a result, the method can ensure normal operation of the main communication system. In addition, in some specific examples, the base station 620 may reselect a most suitable co-existence working mode according to type of the interfering system in conjunction with actual system operational status of the main communication system. Compared with the method where the user equipment alone selects the co-existence mode on its own, the co-existence working mode selected in this way is undoubtedly better suited to the overall system needs.

As a specific example, the user equipment 610 may transmit the activation request via the RRC layer.

For example, when the main communication system is an LTE system, an RRC command, represented as RRC_CoEX_Activation_Request, may be newly added based on the LTE standard. The format of the command may be:

RRC_CoEX_Activation_Request:
Mode: (mode1, mode2, mode3, . . . , modeN)

where mode1, mode2, mode3, . . . , modeN each denote one of N co-existence working modes pre-configured for the user equipment by the base station (N≥1); and Mode: (mode1, mode2, mode3, . . . , modeN) denotes a serial number of the co-existence working mode selected by the user equipment.

Moreover, for example, when the main communication system is an LTE system, the base station may transmit the activation response via the RRC layer. A RRC command, which can be represented as "RRC_CoEX_Activation_Response", may be newly added based on the LTE standard. The format of the command may be:

State: (accept, reject)
Mode: (mode1, mode2, mode3, . . . , modeN)

where State:(accept, reject) denotes the information indicating whether the user equipment is allowed or rejected to enter the co-existence working mode; and Mode: (mode1, mode2, mode3, . . . , modeN) denotes a serial number of the co-existence working mode selected for the user equipment by the base station.

Similarly to the example shown in FIG. 6, in the example shown in FIG. 7, the configuration information of the co-existence working mode pre-configured for the user equipment 610 by the base station 620 may also include information indicating a start delay of the co-existence working mode. The user equipment 610 may determine a start time of the co-existence working mode according to the time when the activation response is successfully received (e.g., the time when an acknowledgement signal that signifies that the user equipment has successfully received the activation response is transmitted) and the start delay (step 712). The base station 620 may determine the time when the user equipment starts the co-existence working mode according to the time when the acknowledgement signal that signifies that the user equipment has successfully received the activation response is received and the start delay (step 718), thereby maintaining synchronization with the user equipment. Optionally, the user equipment 610 may judge according to the configuration information whether to use a transition time after activating the co-existence working mode (step 713). The base station 620 may also judge according to the configuration information whether to use a transition time after the user equipment activates the co-existence working mode (step 719). Optionally, the user equipment may also judge according to the configuration information of a co-existence working mode whether to use a transition time before terminating the co-existence working mode.

Figure 8:
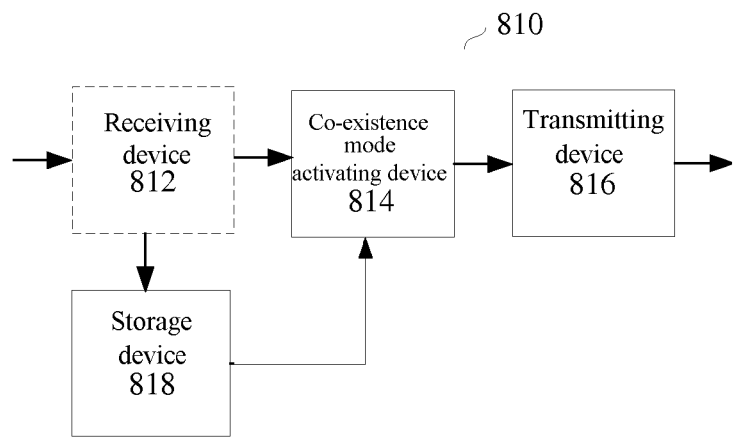
FIG. 8 is a schematic block diagram illustrating a user equipment capable of setting up a co-existence working mode according to an embodiment of the present disclosure.

FIG. 8 illustrates a schematic block diagram of a user equipment configured in a first communication system according to an embodiment. As shown in FIG. 8, the device 810 may include a receiving device 812, a co-existence mode activating device 814, a transmitting device 816 and a storage device 818.

The storage device 818 is configured to store configuration information of a co-existence working mode pre-configured for the user equipment by the base station. Similarly to the above embodiment/example, the storage device 818 may include one or more co-existence working modes and their configuration information pre-configured for the user equipment by the base station.

The transmitting device 816 is configured to transmit to the base station an activation request for requesting to enter the co-existence working mode when the user equipment needs to enter the co-existence working mode (e.g., upon detecting an interfering system). Similarly to the above embodiment/example, the transmitting device may transmit the activation request using MAC layer signaling or RRC layer signaling. Detailed description is therefore omitted here.

In a specific embodiment, the receiving device 812 may receive an acknowledgement signal (as discussed above, an ACK or NACK signal) returned from the base station side signifying whether the base station has successfully received the activation request. After the receiving device 812 receives an ACK signal, the co-existence mode activating device 814 activates a co-existence working mode according to configuration information stored in the storage device 818. When a NACK signal is received, it indicates failure of transmission of the activation request, and the co-existence mode activating device 814 does not activate the co-existence working mode.

In another specific example, the receiving apparatus 812 may also receive an activation response message (e.g., the activation response described with respect to FIG. 3A and FIG. 7) returned from the base station. The co-existence mode activating device 814 activates a co-existence working mode according to pre-configured configuration information when the receiving device 812 receives the activation response.

Similarly to the method examples described above, the activation response may include information indicating whether the user equipment is allowed to enter the co-existence working mode, and the co-existence mode activating device 814 may judge according to the response message whether the user equipment is allowed to activate the co-existence working mode. Detailed description is omitted here. As another example, the activation response may also include information indicating the co-existence working mode appointed by the base station. In this case, the co-existence mode activating device 814 may parse the activation response to obtain the co-existence working mode appointed by the base station, and activate the appointed co-existence working mode.

With the structure shown in FIG. 8, the user equipment 810 can rapidly enter the co-existence working mode. Since the configuration information of the co-existence working mode is pre-configured, the time for activating the co-existence working mode can be significantly reduced, thereby improving the user experience.

Figure 9:
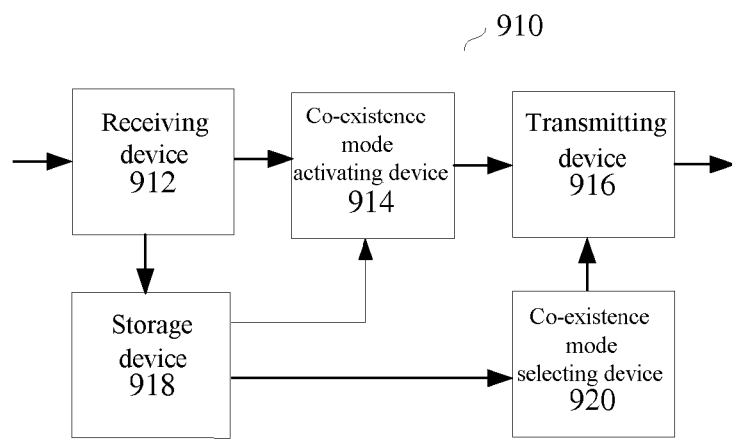
FIG. 9 is a schematic block diagram illustrating a user equipment capable of setting up a co-existence working mode according to another embodiment of the present disclosure.

FIG. 9 illustrates a schematic block diagram of a user equipment configured in a first communication system according to another embodiment. Similarly to the equipment 810 shown in FIG. 8, the equipment 910 also includes a receiving device 912, a co-existence mode activating device 914, a transmitting device 916 and a storage device 918. The difference is that the equipment 910 further includes a co-existence mode selecting device 920.

The receiving device 912, the co-existence mode activating device 914, the transmitting device 916 and the storage device 918 have functions similar to those of the corresponding devices shown in FIG. 8, respectively. Detailed description is omitted here.

The co-existence mode selecting device 920 is configured to select, according to type and configuration of the interfering system and based on the configuration information stored in the storage device 918, a co-existence working mode from a plurality of co-existence working modes pre-configured for the user equipment by the base station. Information indicating the selected co-existence working mode may be transmitted to the base station by the transmitting device 916. As an example, the co-existence mode selecting device 920 may encapsulate information indicating the selected co-existence working mode in the activation request.

Similarly to the method embodiments/examples described above, the configuration information of the co-existence working mode pre-configured for the user equipment 810 or 910 by the base station may include information indicating a start delay of the co-existence working mode. In this case, similarly to the method embodiments/examples described above, the co-existence mode activating device 814 or 914 may determine a start time of the co-existence working mode according to the time when the receiving device 812 an acknowledgement signal that signifies that the base station has successfully received the activation request and the start delay, or determine a start time of the co-existence working mode according to the time when the transmitting device 816/916 returns to the base station an acknowledgement signal that signifies that the user equipment has successfully received the activation response and the start delay. Detailed description is omitted here.

Similarly to the method embodiments/examples described above, the configuration information of the co-existence working mode pre-configured for the user equipment 810 or 910 by the base station may also include information indicating whether to use a transition time after each co-existence working mode is activated or terminated and information of the length of the transition time and the like. In this case, the co-existence mode activating device 814 or 914 may judge, according to the configuration information of the co-existence working mode, whether to use the transition time after activating or terminating the co-existence working mode.

Figure 10:
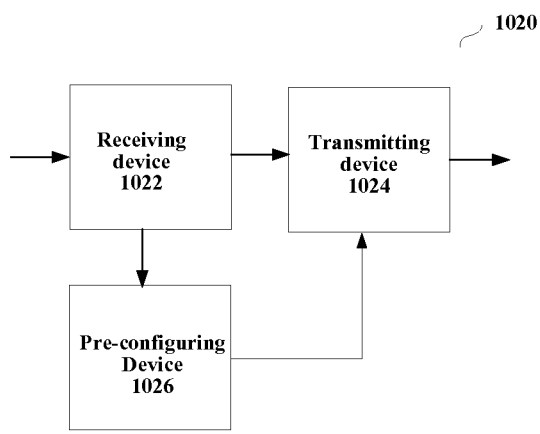
FIG. 10 is a schematic block diagram illustrating a base station capable of setting up a co-existence working mode according to an embodiment of the present disclosure.

FIG. 10 illustrates a schematic block diagram of a base station configured in a first communication system according to an embodiment. As shown in FIG. 10, the base station 1020 may include a receiving device 1022, a transmitting device 1024 and a transmitting device 1026.

The receiving device 1022 may receive an activation request from a user equipment. Similarly to the above embodiments/examples, the receiving device 1022 may receive the activation request via the MAC layer or the RRC layer. Detailed description is omitted here.

In a specific embodiment, the transmitting device 1024 may return, when the receiving device 1022 receives the activation request, to the user equipment an acknowledgement signal (e.g., an ACK or NACK signal) that signifies whether the base station has successfully received the activation request. As another specific embodiment, the transmitting device 1024 may also return, when the receiving device 1022 receives the activation request, to the user equipment a response signal to the activation response, a.k.a. activation response. As an example, the activation response may include information related to whether the user equipment is allowed to activate the co-existent working mode (e.g., the activation response shown with respect to FIG. 7). As another example, the activation response may include information indicating a co-existence working mode appointed for the user equipment by the base station. The transmitting device 1024 may transmit the activation response via the RRC layer. Detailed description is also omitted here.

The pre-configuring device 1026 is configured to pre-configure configuration information of the co-existence working mode for the user equipment. As a specific example, the pre-configuring device 1026 may pre-configure the configuration information of the co-existence working mode for the user equipment using the method shown with respect to FIG. 4 or FIG. 5. Moreover, the pre-configuring device 1026 may pre-configure one or more co-existence working modes and their configuration information for the user equipment.

The usage of the base station shown in FIG. 10 allows the user equipment to rapidly enter the co-existence working mode. Since the configuration information of the co-existence working mode is pre-configured, the time for activating the co-existence working mode can be significantly reduced, thereby improving the user experience.

Figure 11:
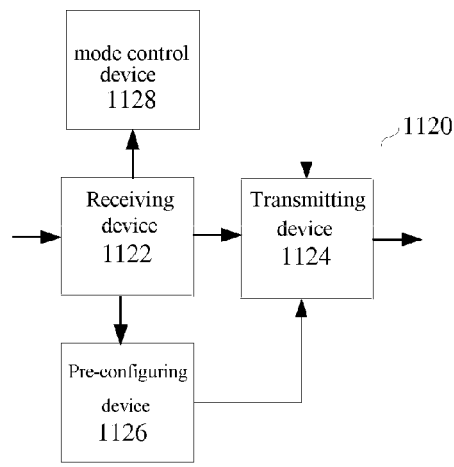
FIG. 11 is a schematic block diagram illustrating a base station capable of setting up a co-existence working mode according to another embodiment of the present disclosure.

FIG. 11 illustrates a schematic block diagram of a base station configured in a first communication system according to another embodiment. Similarly to the base station 1020 shown in FIG. 10, the base station 1120 also includes a receiving device 1122, a transmitting device 1124 and a pre-configuring device 1126. The difference is that the base station 1120 further includes a mode control device 1128.

The receiving device 1122, the transmitting device 1124 and the transmitting device 1126 have functions similar to those of the corresponding devices shown with respect to FIG. 10, respectively. Detailed description is omitted here.

The mode control device 1128 is configured to judge, after the receiving device 1122 receives the activation request, whether to allow the user equipment to activate the co-existence working mode according to system information. The transmitting device 1126 returns to the user equipment information regarding whether to allow the user equipment to activate the co-existence working mode. As an example, the mode control device 1128 may also reselect a co-existence working mode which the user equipment is allowed to enter. The transmitting device 1126 returns to the user equipment information indicating the selected co-existence working mode (e.g., by encapsulating it in the activation response).

Similarly to the method embodiments/examples described above, the configuration information of the co-existence working mode pre-configured for the user equipment by the pre-configuring device 1126 may include information indicating a start delay of the co-existence working mode. In this case, the mode control device may determine a start time of the co-existence working mode according to the time when the transmitting device 1126 transmits the acknowledgement signal that signifies that the base station has successfully received the activation request or the time when the receiving device 1122 receives the acknowledgement signal that signifies that the user equipment has successfully received the activation response and the start delay. Detailed description is omitted here.

Similarly to the method embodiments/examples described above, the configuration information of the co-existence working mode pre-configured for the user equipment by the pre-configuring device 1126 may also be used for information indicating whether to use a transition time after each co-existence working mode is activated or terminated and the information of the length of the transition time and the like. In this case, the mode control device may judge, according to the configuration information of the co-existence working mode, whether to use the transition time after the user equipment activates or receives the co-existence working mode.

Below are given some examples of the configuration information of the co-existence working mode pre-configured for the user equipment by the base station (e.g., the pre-configuring device 1126).

FIRST EXAMPLE

In this example, the configuration information pre-configured for the user equipment by the base station may include one or more of the following items:
1. a start delay of a co-existence mode;
2. a serial number of the default co-existence working mode (in the case where only one default co-existence working mode is configured); and
3. serial numbers of all applicable co-existence working modes that the user equipment is allowed to use.

In the above information, item 1 and item 3 are mutually exclusive, i.e., if the base station configures the information of item 2, it does not configure the information of item 3, and vice versa.

As a specific example, the start delay of a co-existence working mode may be represented by the number of subframes. For example, when the main communication system is an LTE system, the length of a subframe is 1 ms. For example, in the method shown in FIG. 6 the user equipment may calculate the delay from the time when the user equipment receives from the base station side the acknowledgement signal (e.g., ACK signal) that signifies that the base station has successfully received the activation request, and the base station may calculate the delay from the time when the acknowledgement signal is transmitted. For example, assuming that the delay is a subframes ($a \geq 1$) and the user equipment receives the ACK signal at the nth subframe ($n \geq 1$), the (n+a+1)th subframe is to be the first subframe where the co-existence working mode is practiced, that is, the co-existence working mode starts at the (n+a+1)th subframe. For example, in the method shown in FIG. 7, the user equipment may calculate the delay from the time when the user equipment transmits to the base station the acknowledgement signal (e.g., ACK signal) that signifies that the user equipment has successfully received the activation response signal, and the base station may calculate the delay from the time when the acknowledgement signal is received. For example, assuming that the delay is a subframes and the user equipment transmits the ACK signal at the nth subframe, the (n+a+1)th subframe is to be the first subframe where the co-existence working mode is practiced, that is, the co-existence working mode starts at the (n+a+1)th subframe.

As another specific example, the start delay of a co-existence mode may be represented by a serial number. For example, a plurality of values of the delay (i.e., the numbers of delayed subframes) may be selected in advance, which are numbered according to a certain order. Thus, in the configuration information or actual transmission, only the serial number of a corresponding value of the delay is needed to be transmitted.

When the co-existence working mode is TDM-based and the time division multiplexing is implemented in the form of time periods, a time period may be defined, so that each time period includes the first communication system (e.g., LTE) working time and the second communication system (e.g., ISM) working time (In a period, the working time for the first communication system may not be continuous, and the working time for the second communication system may also not be continuous.). In this case, the start delay of the co-existence working mode may be represented by one bit. For example, if the bit of the start delay of a co-existence working mode is 0, it indicates that the co-existence working mode can be started immediately; if the bit of the start delay of a co-existence working mode is 1, it indicates that the co-existence mode cannot be started until a new, complete time period of the co-existence mode starts. For example, in the method shown in FIG. 6, if the bit of the start delay of a co-existence mode is 0, the co-existence mode starts after the user equipment receives the ACK signal from the base station; if the bit of the start delay of a co-existence mode is 1, the co-existence mode starts at the beginning of the first complete time period after the user equipment receives the ACK signal from the base station.

SECOND EXAMPLE

In the case where the base station pre-configures one co-existence working mode for the user equipment, the configuration information of the mode may include one or more of the following items:

1. a start delay of a co-existence working mode;
2. the information indicating whether the co-existence working mode is TDM-based or FDM-based; and
3. one or more of the following items when the co-existence working mode is TDM-based:
  a. time period of the co-existence working mode (including working time of the first communication and working time of the second communication);
  b. the ratio of the working time of the first communication system to the working time of the second communication system in one time period;
  c. working time of the first communication system in one time period;
  d. a serial number of the co-existence working mode;
  e. information indicating whether to use a transition time before the co-existence working mode starts or after the co-existence working mode ends;
  f. the length of the transition time.
4. one or more of the following items when the co-existence working mode is FDM-based:
  g. an uplink PUCCH transmission mode of the first communication system (e.g., LTE);
  h. a serial number of the FDM co-existence working mode.

In the case where the base station pre-configures a plurality of applicable co-existence working modes for the user equipment which the user equipment is allowed to use, the configuration information of each of the co-existence working modes may include:

i. serial number of the co-existence working mode.

where the serial number of the co-existence working mode is the serial number of a co-existence working mode currently configured among a plurality of applicable co-existence modes, the serial number being temporarily agreed upon between the base station and the user equipment.

Specific examples of the above information are described below.

Start Delay

The start delay in the second example may have the format of the start delay in the first example, which is omitted here.

Information Indicating Whether the Co-Existence Working Mode is TDM-based or FDM-based The information indicating whether the co-existence working mode is TDM-based or FDM-based may be represented by one bit. For example, the bit 0 indicates the usage of the TDM manner, while the bit 1 indicates the usage of the FDM manner.

Time Period

When the co-existence working mode is TDM-based, the configuration information may include information about the time period of the mode. For example, when the first communication system is an LTE system and the second communication system is an ISM system, one frame includes 10 subframes. In this case, the information about the time period may include the length of the time period. The length of the time period may be the number of the subframes or contained in one time period. If the length of the time period is an integer multiple of a frame, i.e., an integer multiple of 10 subframes, then each time period may be defined to start by default at the first subframe of a frame. As another example, the time period may not be counted from the first subframe of a frame. Regardless of which subframe to start with, a plurality of subframes whose number corresponds to the length of the time period constitute one time period.

Optionally, the information of the time period of a TDM-based co-existence mode may also include the length of the period and a start offset of the period. The length of a period refers to the number of subframes or frames contained in one period. If the length of a period is an integer multiple of a frame, i.e., an integer multiple of 10 subframes, the start offset of the period may be defined so that each period starts from a certain subframe in a frame.

In the configuration information, the length of a period and the start offset of the period of a co-existence mode may be represented by the specific number of subframes or the number of frames. Optionally, a number of applicable cases may be defined in advance, and are numbered according to a certain order. That is, the length of a period and the start offset of the period of a co-existence mode may be represented by serial numbers.

The Ratio Between the Working Times of the Two Communication Systems in One Time Period The ratio of the working time of the first communication system to the working time of the second communication system in one time period may be represented by a specific ratio value. The ratio may be represented by two subframe numbers (i.e., the number of subframes of the working time of each of the two communication systems in each period), either.

In the case where the length of a period is pre-configured, the ratio of the working time of the first communication system to the working time of the second communication system may be embodied as the number of subframes of the working time of the first communication system in each time period.

The ratio between the working times of the two communication systems may be represented by a serial number. Several applicable ratio values may be defined in advance, and are numbered according to a certain order.

If, in the first communication system (e.g., the LTE standard), a TDM-based allocation scheme of the LTE working time and the ISM working time is defined for each ratio in advance, the abovementioned ratio can be used to indicate which TDM-based allocation scheme is adopted.

If the first communication system uses a regular time allocation scheme and each of the time periods has been configured, the above ratio may be used to represent a specific working time of the first communication system and a specific working time of the second communication system. Here, the so-called regular time allocation scheme is a time allocation scheme where, in one time period, the subframes constituting the working time of the first communication system are continuous from one to another, and the subframes constituting the working time of the second communication system are also continuous from one to another, that is, one time period is divided regularly in two parts.

The Working Time of the First Communication System in One Period

For example, when the first communication system is an LTE system and the second communication system is an ISM system, if the LTE system uses a regular time allocation scheme for the LTE working time and the ISM working time and the ratio of the LTE working time to the ISM working time in one time period has been configured, the working time of the LTE in one period may be represented by one bit, which may indicate whether the LTE should use the first regular working time or the second regular working time in one period. For example, when the bit is 0, it indicates that LTE works before ISM in one period, while when the bit is 1, it indicates that ISM works before LTE in one period.

The working time of the LTE in one period may also be represented as the specific subframes where the LTE works in one period. This information may be represented in the form of a bitmap. For example, "0110111000" may be used to indicate that the length of a period is 10 subframes, wherein the working subframes of the LTE include the first, second, fourth, fifth and sixth subframes, while the working frames of the ISM are the rest of the subframes in the period. The working time of the LTE in one period may also be represented by the specific numbers of the subframes.

When the LTE uses a regular time allocation scheme for the LTE time and the ISM time without configuring the ratio between the LTE working time and the ISM working time, the working time of the LTE in one period may be represented by two values. The first value may be a Boolean value, i.e., using bit 0 or bit 1 to represent whether the LTE should use the first regular working time or the second regular working time in one period. The second value may be a serial number of a subframe, representing the last subframe of the first regular working time or the first subframe of the second regular working time. If the LTE has predefined in this case that the LTE will work in the first regular working time or in the second regular working time, the working time of the LTE in one period may also be represented by a serial number of a subframe, which indicates the last subframe of the first regular working time or the first subframe of the second regular working time.

Indicating Whether to Use a Transition Time before the Co-Existence Working Mode Starts or after the Co-Existence Working Mode Ends The information indicating whether to use a transition time before the co-existence working mode starts or after the co-existence working mode ends may be represented by one or more bits.

For example, when it is represented by one bit, the bit 0 may indicate that a transition time is not used, that is, after the co-existence mode is entered, all incomplete data transmissions are directly terminated and wait to be redistributed or retransmitted after the co-existence mode is entered; the bit 1 may indicate that a transition time is used. When it is represented by two bits, one bit may be used to indicate whether to use a transition time before the co-existence mode is entered, and the other bit may be used to indicate whether to use a transition time after the instruction for terminating the co-existence mode is received.

Length of the Transition Time

For example, when the first communication system is the LTE, if the LTE does not predefine the length of the transition time, the base station may pre-configure the length of the transition time of the co-existence mode for the user equipment.

As a specific example, the length of the transition time may be represented by the number of the subframes. In this example, the length of the transition time after the co-existence mode starts may be equal to the length of the transition time after the co-existence mode ends.

As another specific example, the length of the transition time may also be represented by two subframe numbers. That is, the length of the transition time after the co-existence mode starts may be unequal to the length of the transition time after the co-existence mode ends, and they are represented by two subframe numbers respectively.

In other specific examples, the length of the transition time may be in the form of a serial number. For example, several applicable or common values of the length of the transition time may be agreed upon in advance between the base station and the user equipment, and are numbered according to a certain order.

Those skilled in the art shall understand that the embodiments and/or examples described herein are illustrative, not exhaustive. And the present disclosure is not limited to these embodiments and/or examples.

In the embodiments/examples described above, the first communication and the second communication system are different communication systems that coexist on a user equipment. For example, the first communication system may be, for example, an LTE system, an LTE-A system, other communication systems, or the like; the second communication system (or, the interfering system) may be a Bluetooth system, a WLAN system, a GPS system, and the like configured on the user equipment, which are not enumerated one by one.

It should be noted that, in the present description, expressions such as "first", "second", and the like are used to distinguish one from another of the described features, so as to clearly describe the present disclosure. Therefore, the expressions should not be deemed as limiting in any way.

As an example, the respective steps of a method described above and the respective constituting modules and/or units of an equipment described above may be implemented as software, firmware, hardware or a combination thereof in a base station (e.g., eNodeB) or a terminal node (e.g., user equipment) of a first communication system, as part of the corresponding device of the base station or terminal node. When the respective constituting modules and units in the above-mentioned devices are configured via software, firmware, hardware or a combination thereof, the specific measures or manners which can be used may be those known by persons skilled in the art, and are omitted here.

It can be easily understood that a system including the above equipments shall be regarded as falling within the scope of protection of the present disclosure.

Figure 12:
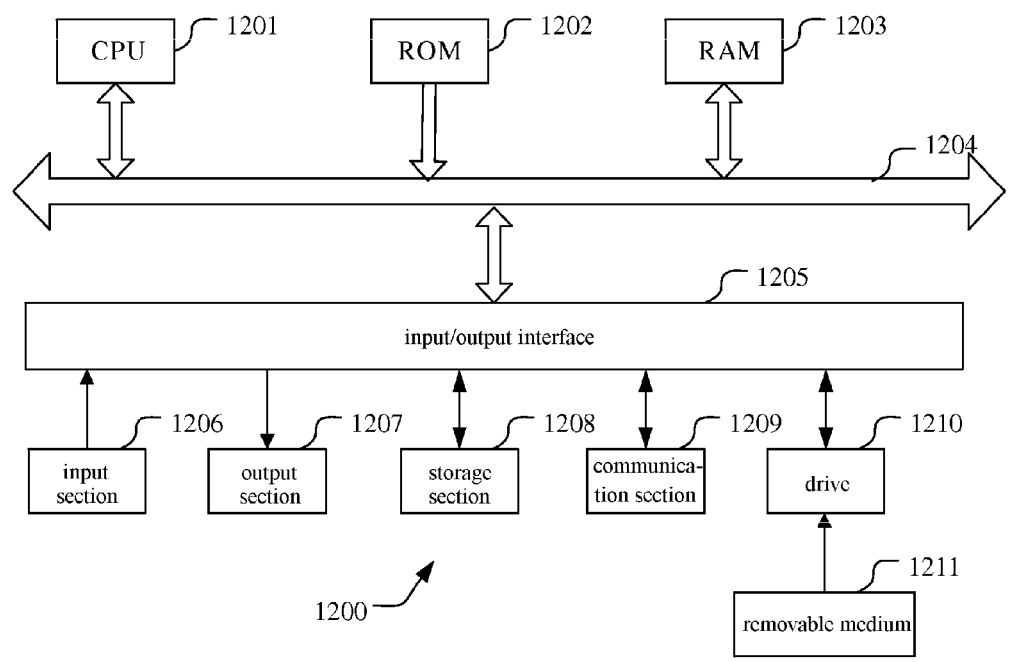
FIG. 12 is schematic block diagram illustrating the structure of a computer for implementing the equipment and the method of the present disclosure.

As an example, when it is implemented with software or firmware, a program constituting the software may be installed to a computer with a dedicated hardware structure (e.g., a general-purpose computer 1200 as shown in FIG. 12) from a storage medium or a network, and the computer is capable of performing various functions when installed with various programs.

In FIG. 12, a Central Processing Unit (CPU) 1201 performs various processes based on a program stored in a Read Only Memory (ROM) 1202 or a program loaded from a storage section 1208 to a Random Access Memory (RAM) 1203. In the RAM 1203, necessary data for the CPU 1201 to perform the various processes or the like are also stored as required. The CPU 1201, the ROM 1202, and the RAM 1203 are linked to each other via the bus 1204. The input/output interface 1205 is also linked to the bus 1204.

To the input/output interface 1205 are linked: an input section 1206 (including a keyboard, a mouse or the like); an output section 1207 (including a display such as Cathode Ray Tube (CRT), a Liquid Crystal Display (LCD) or the like, and a loudspeaker or the like); the storage section 1208 (including a hard disk or the like); and a communication section 1209 (including a network interface card such as a LAN card, a modem, or the like). The communication section 1209 performs a communication process via a network such as the Internet. A drive 1210 may also be linked to the input/output interface 1205 as required. A removable medium 1211, such as a magnetic disk, an optical disc, a magneto-optical disk, a semiconductor memory and the like, is installed on the drive 1210 as required, so that a computer program read therefrom is installed into the storage section 1208 as required.

In the case where the series of processes described above are implemented with software, the program that constitutes the software is installed from a network such as the Internet or a storage medium such as the removable medium 1211.

Those skilled in the art shall appreciate that, the storage medium is not limited to the removable medium 1211 having the program stored therein as shown in FIG. 12, which is delivered separately from the device for providing the program to the user. Examples of the removable medium 711 include a magnetic disk (including a floppy disk (registered trademark)), an optical disc (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 1202, a hard disk included in the storage section 1208, or the like, which have the program stored therein and are delivered to the user along with the device that contains them.

The present disclosure also provides a program product which has machine-readable instruction codes stored therein. When read and executed by a machine, the instruction codes can execute the method according to an embodiment of the present disclosure described above.

Accordingly, the disclosure of the present disclosure includes a storage medium for carrying the abovementioned program product which has machine-readable instruction codes stored therein. The storage medium includes, but is not limited to, a floppy disk, an optical disc, a magneto-optical disk, a memory card, a memory stick, and the like.

In the above description of the specific embodiments of the present disclosure, a feature described and/or shown with respect to one embodiment may be used in one or more other embodiments in the same or a similar way, so as to combine with or replace a feature in the other embodiment.

It should be noted that, as used herein, the terms "comprise" and "include" refer to the presence of a feature, element, step, or component, but does not exclude the presence or addition of one or more other features, elements, steps, or components.

In addition, the method of the present disclosure is not limited to be preformed in the time order described in the description, and may be performed in parallel, or independently, or in some other time order. Therefore, the execution sequence of the method described in the present description does not limit the technical scope of the present disclosure.

Although the present disclosure has been disclosed by the description of the specific embodiments of the present disclosure, it should be noted that various modifications, improvements or equivalents can be made by those skilled in the art within the spirit and scope of the claims attached hereto. These modifications, improvements or equivalents should be deemed as falling within the scope of protection of the present disclosure, either.

What is claimed is:

1. A method for activating a co-existence working mode, comprising:
   transmitting, by a user equipment of a first communication system to a base station in the first communication system, an activation request for requesting to enter a co-existence working mode in which the user equipment performs a first communication with the base station and performs a second communication with an apparatus of a second communication system, which is different from the first communication system, by using different transmission resources;
   receiving, by the user equipment, information about the co-existence working mode chosen for the user equipment by the base station, wherein the co-existence working mode chosen by the base station is either a time-division multiplexing manner or a frequency-division multiplexing manner; and
   activating, by the user equipment, the co-existence working mode according to configuration information of the co-existence working mode,
   wherein the configuration information of the co-existence working mode is pre-configured for the user equipment by the base station and is stored in the user equipment before the user equipment transmits the activation request.

2. The method of claim 1, wherein transmitting the activation request to the base station comprises:
   transmitting the activation request to the base station by using Media Access Control signaling.

3. The method of claim 1, wherein a plurality of co-existence working modes are pre-configured by the base station for the user equipment, and the method further comprises:
   selecting by the user equipment a co-existence working mode from the plurality of pre-configured co-existence working modes according to the second communication system, and
   encapsulating information indicating the selected co-existence working mode in the activation request.

4. The method of claim 1, further comprising:
   receiving by the user equipment an activation response returned from the base station in response to the activation request,
   wherein the co-existence working mode is activated after the user equipment receives the activation response.

5. The method of claim 4, wherein the activation response comprises information indicating whether the user equipment is allowed to activate the co-existence working mode, and the method further comprises:
   judging, by the user equipment according to the activation response, whether the user equipment is allowed by the base station to activate the co-existence working mode, and if yes, activating the co-existence working mode.

6. A user equipment, configured in a first communication system and having a co-existence working mode in which the user equipment performs a first communication with a base station in the first communication system and performs a second communication with an apparatus of a second communication system, which is different from the first communication system in a time-division multiplexing manner or a frequency-division multiplexing manner, the user equipment comprising:

a storage device, storing configuration information of the co-existence working mode pre-configured for the user equipment by the base station;

a transmitting device, transmitting to the base station a Radio Resources Control signaling including an indication information to enter the co-existence working mode after interference from the second communication system is detected by the user equipment; and a receiving device, receiving information about the co-existence working mode chosen for the user equipment by the base station, wherein the co-existence working mode chosen by the base station is either a time-division multiplexing manner or a frequency-division multiplexing manner, and wherein the configuration information of the co-existence working mode is pre-configured by the base station and stored by the storage device before the transmitting device transmits the Radio Resources Control signaling.

7. The user equipment of claim 6, wherein the storage device stores configuration information of a plurality of co-existence working modes pre-configured for the user equipment by the base station, and the user equipment further comprises:

a co-existence mode selecting device, configure to select a co-existence working mode from the plurality of pre-configured co-existence working modes according to the second communication system, and encapsulate information indicating the selected co-existence working mode in the Radio Resources Control signaling.

8. The user equipment of claim 6, wherein:

the receiving device is configured to receive an activation response returned from the base station in response to the Radio Resources Control signaling, said activation response including the information about the co-existence working mode chosen for the user equipment by the base station, and the user equipment further comprises a co-existence mode activating device, for activating the co-existence working mode chosen for the user equipment by the base station after the receiving device receives the activation response.

9. The user equipment of claim 8, wherein the activation response comprises information indicating whether the user equipment is allowed to enter the co-existence working mode, and the co-existence mode activating device is configured to:

judge whether the user equipment is allowed by the base station to enter the co-existence working mode according to the activation response, and if yes, activate the co-existence working mode chosen for the user equipment by the base station.

10. A base station, configured in a first communication system, and comprising:

a receiving device, receiving from a user equipment of the first communication system a Radio Resources Control signaling including an indication information to make it possible for the user equipment to enter a co-existence working mode in which the user equipment performs a first communication with the base station and performs a second communication with an apparatus of a second communication system, which is different from the first communication system in a time-division multiplexing manner or a frequency-division multiplexing manner;

a pre-configuring device, pre-configuring, before the receiving device receives the Radio Resources Control signaling, configuration information of the co-existence working mode for the user equipment so that the configuration information of the co-existence working mode is stored in the user equipment; and a mode control device, selecting, after the receiving device receives the Radio Resources Control signaling, a co-existence working mode which the user equipment is allowed to enter according to system status of the first communication system, wherein the co-existence working mode selected by the base station is either a time-division multiplexing manner or a frequency-division multiplexing manner.

11. The base station of claim 10, further comprising:

a transmitting device, transmitting, after the receiving device receives the Radio Resources Control signaling, an activation response in response to the Radio Resources Control signaling to the user equipment.

12. The base station of claim 10, wherein:

the mode control device further judges, after the receiving device receives the Radio Resources Control signaling and before selecting a co-existence working mode which the user equipment is allowed to enter according to system status of the first communication system, whether to allow the user equipment to enter the co-existence working mode according to system status of the first communication system; and encapsulates information indicating whether the user equipment is allowed to enter the co-existence working mode in the activation response.

13. The base station of claim 11, wherein:

the transmitting device is configured to return information indicating the selected co-existence working mode to the user equipment.

14. The base station of claim 12, wherein the configuration information comprises information indicating a start delay of the co-existence working mode, and the mode control device is further configured to:

determine a start time of the co-existence working mode according to the start delay and a time of returning to the user equipment an acknowledge signal which acknowledges that the base station has successfully received the Radio Resources Control signaling.

* * * * *